United States Patent Office 3,062,882
Patented Nov. 6, 1962

3,062,882
PREPARATION OF N-ARYLALKYL AMIDES
Chester L. Parris, Pittsburgh, Pa., assignor to Pittsburgh Plate Glass Company, a corporation of Pennsylvania
No Drawing. Filed Oct. 29, 1957, Ser. No. 693,031
6 Claims. (Cl. 260—558)

This invention relates to a novel method for the preparation of N-aralkyl amides and it has particular relation to the preparation of such amides by the reaction of an aralkanol and a nitrile.

It has heretofore been observed that nitriles such as acrylonitrile can be reacted with secondary or tertiary monohydric alcohols of the aliphatic series to produce amides in which there is attached to the amide nitrogen atom the radical derived by removing the hydroxyl group (—OH) from the alcohol. This reaction has been observed to proceed most satisfactorialy with the tertiary alcohols and to a lesser extent with the secondary alcohols. With the primary alcohols, the reaction does not proceed at all, or at least does not proceed in a satisfactory manner.

The foregoing reactions have heretofore been employed primarily to provide monoamides. The reaction does not appear to have been employed in the preparation of N-aralkyl amides, a class of materials useful in the preparation of amines, isocyanates, and other compounds valuable in the preparation of many polyamide resins and polyurethane resins.

This invention is based upon the discovery that nitriles will react with primary alcohols in which a hydroxymethyl group is substituted for hydrogen in an aromatic ring and preferably in ortho or para relationship with respect to an alkane group or an alkoxy group to give useful N-aralkyl amides. The invention is of particular importance in the preparation of N-aralkyl amides involving two or even three amide groups attached to an aromatic nucleus by a methylene (—CH$_2$—) group.

However, compounds in which a single amide group is attached to an aromatic nucleus by a methylene group may also be prepared by this method. The latter types of amides often can be used in the formulation of drugs, wetting agents and other materials.

The fact that the reaction proceeds in the manner described to give substantial yields of amides is very surprising, since it would be expected that the aromatic alcohol would be self condensed under the acidic conditions employed to give polymeric products.

The aromatic alcohols which are reacted with nitrils in accordance with this invention possess the structure:

Ar—(CH$_2$—OH)$_n$

In the formula, Ar is an aromatic radical having at least one substituent selected from the class consisting of alkyl groups and alkoxy groups, preferably lower alkyl and lower alkoxy, in ortho or pararelationiship to a —CH$_2$OH group. If the activating alkyl or alkoxy group is not ortho or para to the —CH$_2$OH, the latter is relatively inactive. The $n$ in the formula is a whole number from 1 to 5, and preferably 1 to 3.

Examples of alcohols which may be utilized include p-methylbenzyl alcohol, o-methylbenzyl alcohol, 4,6-bis-(hydroxymethyl)-m-xylene, 2,4-dimethylbenzyl alcohol, bis(hydroxymethyl)-mesitylene, bis(hydroxymethyl)-durene, 2,5-bis(hydroxymethyl)-p-xylene, p-methoxybenzyl alcohol, and the like.

The nitriles contemplated by the present invention embody a broad class of compounds of the generalized type:

RCN where R is hydrogen or an organic radical, preferably an alkyl or aryl radical.

The following are some typical examples of the groups represented by the R in the above formula:

H—
H$_2$N—
CH$_3$—
CH$_3$CH$_2$—
HOCH$_2$CH$_2$—
C$_2$H$_5$O—COCH$_2$—
C$_6$H$_5$—
C$_6$H$_5$CH$_2$—
n-C$_7$H$_{15}$—
n-C$_9$H$_{19}$—
n-C$_{11}$H$_{23}$—
n-C$_{13}$H$_{27}$—
CH$_2$=CH—
CH$_2$=CH—CH$_2$—
CH$_3$CH=CH—

$$CH_2=\overset{CH_3}{\underset{|}{C}}-$$

Dinitriles such as adiponitrile, succinonitrile, etc., are included, as are cyano acids such as cyanoacetic acid and esters thereof such as methyl cyanoacetate and others.

The reaction of the aromatic alcohol with the nitrile in accordance with this invention is believed to proceed substantially in accordance with the following equation:

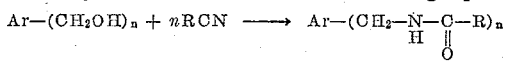

wherein Ar, R, and n have the significance set forth above. It is to be understood, however, that in some instances where two or more —CH$_2$OH groups are present as substituents on the aromatic nucleus, the reaction product may actually also have a —CH$_2$OH group present in the molecule. This is likely to occur when a compound such as the following is employed as a reactant:

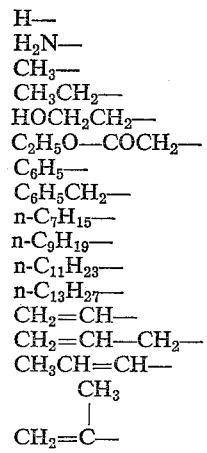

The —CH$_2$OH group in the 2-position of this compound may not under certain conditions react with the nitrile, so that the resulting product could possess this group also. It is intended that such compounds be included within the scope of this invention.

Many of the compounds of the general structure

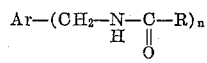

have not been prepared hertofore. For example, those compounds possessing the structure

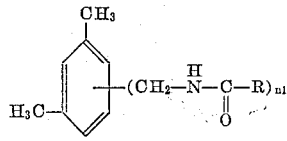

wherein R has the significance given above, and $n_1$ is 2, are novel.

The reactants are preferably brought together in an amount such that there is present at least a mole, and preferably a slight excess, of the nitrile for each —CH$_2$OH group of the alcohol. If substantially less than this amount is employed, condensation may take place between the —CH$_2$OH groups to give polymeric materials in addition to the desired amides. In those instances where it is important to obtain such polymeric products, smaller amounts of the nitrile should be utilized. Any excess of the nitrile may be employed, although it is obviously not an economical procedure to utilize extremely large excesses.

Preferably the reaction between the nitrile and the aromatic alcohol is conducted in the substantial absence of water and in the presence of catalyst. Suitable catalysts include acids such as phosphoric acid, polyphosphoric acid, sulfuric acid, and alkanesulfonic acids such as toluenesulfonic acid, and the Lewis acids such as zinc chloride, aluminum chloride, boron trichloride etherate, and the like. Sulfuric acid and zinc chloride, when employed to promote the reaction, preferably are dissolved in an anhydrous solvent or diluent, e.g., 25 percent to 80 per cent based upon the catalyst mixture, of an anhydrous solvent or diluent such as a carboxylic acid, e.g, anhydrous acetic acid. In conducting the reaction, strong mineral acids, with or without diluents, are generally preferred. It is preferred to employ the catalyst in a ratio of about 20 percent to 80 percent by weight based upon the total mixture of reactants plus catalyst.

The temperature of the reaction may vary over a relatively broad range, for example, from about 25° C. to about 130° C., dependent upon the speed with which it is desired to effect reaction. Temperatures may actually exceed the foregoing limits in either direction under particular conditions.

At lower temperatures, the reaction proceeds relatively slowly and may require as long as several days to reach a satisfactory degree of completion. In some instances the temperature rises exothermically and the application of external heat, except possibly to initiate the reaction, at least during the initial stages of reaction, is not required. However, the desired temperature range may be reached or maintained either by application of external heat or by cooling, as particular conditions may require. Usually, the reaction is completed in a period of about 30 minutes to 60 hours, depending upon the temperature at which the reaction is conducted.

The products initially may be in the form of loose salts or complexes of the amides, but these, if formed, are readily hydrolyzed by water to liberate the free amides. At the conclusion of the reaction, the product may be purified by washing out any water soluble components including excesses of catalyst by the use of aqueous ammonia. The salt is concurrently hydrolyzed to provide the amide. The product may then be dried.

The amides prepared by the foregoing methods are useful for various purposes. For example, they may be hydrolyzed by refluxing with a strong aqueous mineral acid such as sulfuric acid to form the corresponding amines such as the diamines. This, however, is a much more vigorous reaction than the hydrolysis to liberate the amides from their salts. The diamines so obtained are useful for various purposes, as for example, in the reaction with dicarboxylic acids such as sebacic acid or adipic acid to form thermoplastic polyamide resins which may be spun into filaments useful in fabrics, cordage, and the like. Likewise, these amines may be employed as hardening agents in place of conventional amines in the curing of epoxy resins.

The amines such as the diamines may be reacted with hydrochloric acid to form salts, which in turn can be treated with phosgene to form the corresponding isocyanates and more particularly the diisocyanates. These diisocyanates may be reacted with polyhydric alcohols such as castor oil or mixtures thereof with polyethylene glycol. They may also be reacted with polyesters containing unreacted hydroxyls to form polyurethane resins. Useful polyesters for this purpose are represented by those of dicarboxylic acids such as adipic acid, azelaic acid, sebacic acid, or phthalic acid, with polyhydric alcohols such as ethylene glycol, diethylene glycol, propylene glycol, and others, or mixtures thereof with polyhydric alcohols, such as polyols containing more than two hydroxyl groups. The polyesters usually have hydroxyl values of about 40 to 600. The polyurethane resins thus obtained may be used for coating surfaces of metal, wood, concrete, stone, or the like materials to provide decorative or protective finishes upon substrates of the foregoing materials.

An advantage of such diisocyanates resides in the fact that they possess but little odor as compared with conventional diisocyanates which possess disagreeable odors. Moreover, films of the polyurethanes prepared from these diisocyanates do not darken on exposure to light as do films of polyurethanes prepared from diisocyanates such as tolylene diisocyanates.

The following examples are illustrative of the preparation of novel compounds in accordance with the provisions of the present invention.

*Example I*

In this example, 4,6-bis(hydroxymethyl)-m-xylene of the formula:

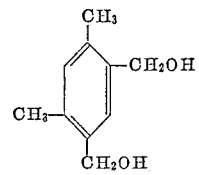

is employed as the alcohol component of the starting mixture. The foregoing compound may be prepared in convenient manner as for example, by treating 4,6-bis-(chloromethyl)-m-xylene with alkali, such as dilute sodium hydroxide, to replace chlorine by hydroxyl (—OH), and to form sodium chloride.

In order to prepare 4,6-bis(acrylamidomethyl)-m-xylene in accordance with the provisions of the present example, a slurry is prepared comprising a mixture of:

| | |
|---|---|
| 4,6-bis(hydroxymethyl)-m-xylene _____grams__ | 16.6 |
| Acrylonitrile _____do____ | 15.6 |
| Phosphoric acid (85 percent)_____milliliters__ | 100.0 |

The mixture is placed in an appropriate reaction vessel such as a round bottom flask equipped with a thermometer, a stirrer, and means to raise or lower the temperature as may be necessary to keep the reaction proceeding smoothly. The reaction is exothermic and the temperature is allowed to rise to about 55° C., at which point the reaction mixture becomes pink and then changes to yellow. Ultimately, it reaches an opaque, homogeneous state. The mixture is allowed to stand for a period of about 24 hours and is then slowly poured into 500 milliliters of cold water. A voluminous white precipitate is formed which is washed with aqueous ammonia to remove excess catalyst and other soluble materials. A yield of 26.5 grams (98 percent) of a crude product which is essentially 4,6-bis(acrylamidomethyl) - m - xylene is obtained. The crude product when heated to 250° C. homopolymerizes to a resin which is infusible, or thermoset.

The 4,6-bis(acrylamidomethyl)-m-xylene may also be purified by crystallization from methyl alcohol. The resultant purified product does not melt but homopolymerizes to form a thermoset resin at temperatures above 200° C.

The analysis of the 4,6-bis(acrylamidomethyl)-m-xylene as obtained experimentally, is as follows:

| | Percent |
|---|---|
| Carbon _____ | 70.70 to 70.79 |
| Hydrogen _____ | 7.50 to 7.41 |
| Nitrogen _____ | 10.32 |

This compares quite favorably with the theoretical analysis calculated upon the basis of the formula $C_{16}H_{20}N_2O_2$, which is:

| | Percent |
|---|---|
| Carbon | 70.56 |
| Hydrogen | 7.40 |
| Nitrogen | 10.29 |

In this example, it is contemplated to replace the m-xylene moiety with corresponding moieties of other aromatic compounds such as mesitylene, durene, p-xylene, anisole and others containing a methyl, ethyl, methoxy, or ethoxy group as a substituent on the aromatic nucleus.

The phosphoric acid employed to promote the reaction may be replaced by sulfuric acid or a mixture of sulfuric acid in glacial acetic acid. Likewise, it could be replaced by a mixture of zinc chloride in the same medium (glacial acetic acid) or by other Lewis acids.

*Example II*

In accordance with this example, the acrylonitrile of Example I is replaced by acetonitrile. The functioning components of the reaction mixture comprise:

| | Grams |
|---|---|
| 4,6-bis(hydroxymethyl)-m-xylene | 16.6 |
| Acetonitrile | 9.1 |

In the reaction, phosphoric acid may again be employed as a catalyst. The acid is of 85 percent strength and is employed in an amount of 100 milliliters. The resultant mixture is agitated in a flask for 16 hours and is then poured into water. A precipitate is formed which is filtered, washed, and dried to give 19 grams (77 percent) of crude 4,6-bis(acetamidomethyl)-m-xylene which, after crystallization from methanol, melts at 258° C. to 260° C. The theoretical formula of this material is $C_{14}H_{20}N_2O_2$. The theoretical analysis is:

| | Percent |
|---|---|
| Carbon | 67.71 |
| Hydrogen | 8.12 |
| Nitrogen | 11.18 |

The analysis as experimentally determined is:

| | Percent |
|---|---|
| Carbon | 67.70 |
| Hydrogen | 8.06 |
| Nitrogen | 11.16 |

This material may be converted to the corresponding diamine for such uses as have previously been described.

*Example III*

In this example, the acetonitrile of Example II is replaced by methacrylonitrile. The procedure is substantially as described in the foregoing example. The product obtained is 4,6-bis(methacrylamidomethyl)-m-xylene.

*Example IV*

In the reaction of 4,6-bis(hydroxymethyl)-m-xylene with acetonitrile in a mixture of sulfuric acid and acetic acid, two products are obtained. One product is 4,6-bis-(acetamidomethyl)-m-xylene (I). The other product, M.P. 112° C., has an infrared spectrum which shows the presence of an ester group. The analysis of the compound indicates it is a mixed ester-amide (II):

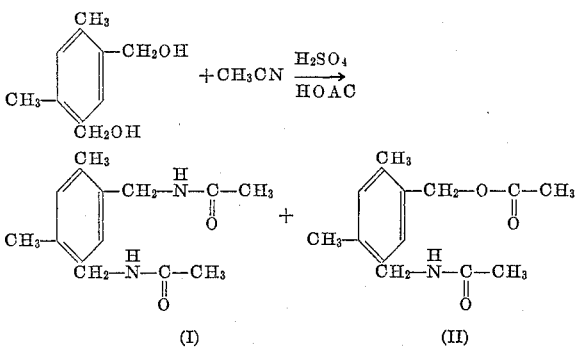

A mixture consisting of:

9.1 grams (0.22 mole) acetonitrile
16.6 grams (0.10 mole) 4,6-bis(hydroxymethyl)-m-xylene was placed in a 500 milliliter flask equipped with a stirrer and thermometer. A cooled mixture of 15 milliliters of sulfuric acid in 175 milliliters of acetic acid was added. An exothermic reaction occurred and a clear, yellow solution was formed. After stirring overnight, the mixture was poured into water and made alkaline with ammonium hydroxide. An oil was formed which slowly solidified. The soft solid was filtered and air dried, then dissolved in a hot mixture of benzene and methanol. After cooling, 2.0 grams of crystals were obtained, M.P. 197° C. to 237 C. After one recrystallization from methanol the melting point was 244° C. to 247° C. The infrared spectrum was identical with 4,6-bis(acetamidomethyl)-m-xylene (I) obtained in Example II.

The original filtrate was concentrated to a small volume, then dissolved in a mixture of benzene and petroleum ether. After cooling and filtration, the resulting solid weighed 10 grams and melted at 106° C.–110° C., and at 111° C.–114° C. after a second crystallization. This material was distilled, B.P. 200° C.–210° C. (0.3 millimeter), then recrystallized again from benzene and petroleum ether after which the M.P. was 114° C.–115° C. The compound was found to contain 5.82 percent nitrogen. The compound designated as the mixed ester-amide theoretically contains 5.62 percent nitrogen.

In a manner similar to that described in Example II, 4,6-bis(hydroxymethyl)-m-xylene can be reacted with chloracetonitrile, benzonitrile, and chlorpropionitrile to give the following compounds respectively:

4,6-bis(chloracetamidomethyl)-m-xylene; M.P. 215° C.–218° C. (with decomposition)
4,6 - bis(benzamidomethyl) - m - xylene; M.P. 264° C.–265° C.
4,6-bis(chlorpropionamidomethyl)-m-xylene; M.P. 212° C.–214° C.

*Example V*

In the reaction of 2,4-dimethylbenzyl alcohol with acetonitrile in acetic-sulfuric acid mixture there are obtained two products; one product is the acetate of 2,4-dimethylbenzyl alcohol (III); the other is N-(2,4-dimethylbenzyl)-acetamide (IV):

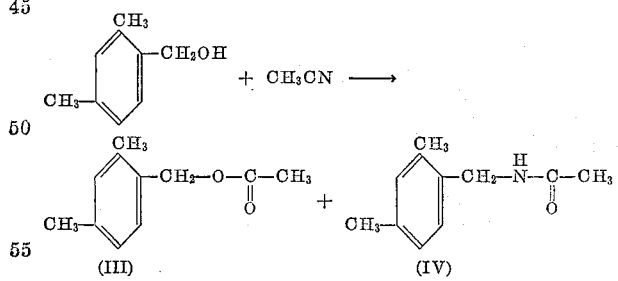

A mixture consisting of: 4.5 grams (0.11 mole) acetonitrile, 13.6 grams (0.10 mole) 2,4-dimethylbenzyl alcohol was placed in a 500 milliliter flask fitted with a stirrer and a thermometer. A cooled mixture of 5.5 milliliters of sulfuric acid in 175 milliliters of acetic acid was then added. A clear solution was formed with no observable exothermic reaction. After stirring overnight, the mixture was poured into water and allowed to stand for 72 hours. The resulting precipitated oil contained long crystalline needles. The entire product was extracted with benzene and the benzene extract was then distilled. After removal of the solvent, the residue was fractionated to give:

(a) Five grams of a colorless oil, B.P. 65° C.–72° C. (0.1 millimeter) $n_D^{25}$ 1.5040. The refractive index was identical with authentic 2,4-dimethylbenzyl acetate.

(b) A crystalline solid, B.P. 130° C.–140° C. (0.2 millimeter). After recrystallization from a mixture of benzene and petroleum ether the M.P. was 112° C–113°

C. By mixed melting point and comparison of infrared spectra the product was shown to be identical with authentic N-(2,4-dimethylbenzyl)acetamide prepared according to Nightingale and Shanholzer, Journal of Organic Chemistry, 7, 6 (1942). The yield was 6.1 grams (33 percent of theoretical).

*Example VI*

It has already been indicated that the bis(acetamidomethyl)-m-xylenes can readily be hydrolyzed with an aqueous mineral acid to form the corresponding diamines. For example, the diamine derived from 4,6-bis(acetamidomethyl)-m-xylene possesses the structure:

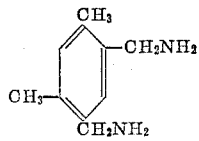

The acid employed in this hydrolysis preferably is aqueous. Aqueous sulfuric acid or hydrochloric acid or aqueous phosphoric acid or an aqueous mixture of one of the foregoing acids in a carboxylic acid, such as acetic acid, may be used.

In conducting the reaction, a suitable reaction mixture comprises:

| | |
|---|---|
| 4,6-bis(acetamidomethyl)-m-xylene _____grams__ | 496 |
| Concentrated sulfuric acid_____milliliters__ | 250 |
| Water _____do_____ | 2500 |

This mixture is refluxed with vigorous agitation for 33½ hours and is then cooled. The cooled mixture is further treated with 500 milliliters of benzene and the mixture is filtered and the benzene layer, together with the residue (35 grams) is discarded.

The aqueous layer is made alkaline with 450 grams of sodium hydroxide in 1 liter of water. The solution is further diluted with water to a total volume of 5 liters after which it is extracted continuously with benzene for 5 hours and then with butanol for 44 hours. The combined extracts are concentrated and the crystalline residue is slurried with an aromatic petroleum hydrocarbon solvent. The slurry is filtered and the product is recrystallized from methanol to give 4,6-bis(aminomethyl)-m-xylene having a melting point of 129° C. to 130° C. This material can be reacted with dibasic acids such adipic acid or sebacic acid to provide a polyamide similar to commercially available polyamides but having an advantageously higher melting point.

*Example VII*

In accordance with this example, 4,6-bis(acetamidomethyl)-m-xylene is converted to the corresponding diamine by hydrolysis with hydrochloric acid. The reaction mixture comprises:

| | |
|---|---|
| 4,6-bis(acetamidomethyl)-m-xylene _____grams__ | 744 |
| Glacial acetic acid_____liter__ | 1 |
| Concentrated hydrochloric acid_____do____ | 1 |

The mixture is refluxed for 20 to 26 hours and is then cooled. The excess acids are removed by distillation under vacuum, forming a thick, gummy mass of crystalline nature. The mass is chilled, slurried in a petroleum hydrocarbon and filtered to provide a product melting in a range of 245° C. to 261° C. The filtered solids are treated with 1200 milliliters of 25 percent sodium hydroxide and 1 liter of toluene to provide a solid phase and two liquid phases. The aqueous liquid phase is discarded. The solid phase is filtered off, washed with toluene and then with aromatic petroleum naphtha, and finally is recrystallized from methanol to provide 4,6-bis(aminomethyl)-m-xylene having a melting point in a range of 124° C. to 129° C. This material after two recrystallizations from a methanol-benzene mixture, separates as long colorless spikes having a melting point of 130° C. to 131°

C. The product of the formula $C_{10}H_{10}N_2$ is of the theoretical analysis:

| | Percent |
|---|---|
| Carbon | 73.12 |
| Hydrogen | 9.82 |
| Nitrogen | 17.06 |

The experimentally determined analysis is:

| | Percent |
|---|---|
| Carbon | 72.96 to 73.03 |
| Hydrogen | 9.69 to 9.70 |
| Nitrogen | 17.10 |

*Example VIII*

In accordance with this example, 4,6-bis(aminomethyl)-m-xylene is reacted with dry hydrogen chloride to provide the corresponding hydrochloride which has a melting point of about 305° C.–310° C. This salt is suspended in tetralin (a non-reactive solvent) in a ratio of 59.3 grams of the salt to 500 milliliters of tetralin. The mixture is treated with a stream of chlorine-free phosgene gas at a temperature of 200° C.–205° C. for a period of about 5 to 7 hours or until the evolution of hydrogen chloride is complete and none of the dihydrochloride is evident as a suspension in the solution. The resultant dark solution is cooled, filtered through diatomaceous earth and the solvent is distilled. The residue is distilled under vacuum, boiling point 165° C.–167° C. (3 millimeters) or 171° C.–173° C. (8 millimeters), refractive index $n_D^{24}$ 1.5407, to obtain 36 to 38 grams of colorless oil constituting 69 percent to 70 percent of the theoretical yield of a product which is 4,6-bis(isocyanatomethyl)-m-xylene. The latter is adapted to enter into substantially the same reactions as conventional tolylene diisocyanates. It will, for example, react with castor oil and with polyesters of adipic acid and polyhydric alcohols such as diethylene glycol and glycerol or mixtures of the two to form polyurethane resins. The latter may be employed as coatings and as foams.

The product of formula $C_{12}H_{12}N_2O_2$ has the theoretical analysis:

| | Percent |
|---|---|
| Carbon | 66.65 |
| Hydrogen | 5.60 |
| NCO equivalent | 108 |

The experimentally determined analysis is

| | Percent |
|---|---|
| Carbon | 66.84–67.02 |
| Hydrogen | 5.68–5.74 |
| NCO equivalent | 113 |

The 4,6-bis(isocyanatomethyl)-m-xylene possesses a substantial advantage over conventional tolylene diisocyanates, inasmuch as it possesses but little or no odor, whereas the tolylene diisocyanates are of very objectionable odor.

4,6-bis(aminomethyl)-m-xylene, when reacted with sebacic acid or adipic acid forms polyamide resins which are characterized by relatively high melting points, for example, about 40° C. to 50° C. or higher, than those of the corresponding commercially available polyamide products. They are, therefore, adapted for uses where the temperatures are higher than permissible with the conventional nylon type polyamide resins.

The forms of the invention as herein shown and described are to be considered as being by way of example. It will be apparent to those skilled in the art that numerous modifications may be made therein without departure from the spirit of the invention or the scope of the appended claims.

I claim:

1. The method of preparing 4,6-bis(acrylamidomethyl)-m-xylene which comprises bringing together at a temperature of about 25° C. to about 130° C., in the presence of a mineral acid cataylst and a monocarboxylic acid, acrylonitrile and 4,6-bis(hydroxymethyl)-m-xylene.

2. The method of preparing 4,6-bis(acetamidomethyl)-m-xylene which comprises bringing together at a temperature of about 25° C. to about 130° C., in the presence of a mineral acid catalyst and a monocarboxylic acid, acetonitrile and 4,6-bis(hydroxymethyl)-m-xylene.

3. The method of preparing 4,6-bis(chloracetamidomethyl)-m-xylene which comprises bringing together at a temperature of about 25° C. to about 130° C., in the presence of a mineral acid catalyst and a monocarboxylic acid, chloracetonitrile and 4,6-bis(hydroxymethyl)-m-xylene.

4. The method of preparing 4,6-bis(benzamidomethyl)-m-xylene which comprises bringing together at a temperature of about 25° C. to about 130° C., in the presence of a mineral acid catalyst and a monocarboxylic acid, benzonitrile and 4,6-bis(hydroxymethyl)-m-xylene.

5. The method of preparing 4,6-bis(chlorpropionamidomethyl)-m-xylene which comprises bringing together at a temperature of about 25° C. to about 130° C., in the presence of a mineral acid catalyst and a monocarboxylic acid, chlorpropionitrile and 4,6-bis(hydroxymethyl)-m-xylene.

6. The method of preparing N-(arylmethyl) amides comprising reacting an aryl compound of the formula

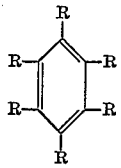

wherein R is selected from the group consisting of hydrogen, lower alkyl, lower alkoxy and —CH$_2$OH and wherein at least one and not more than four of said R's are —CH$_2$OH; and, in a molar excess, a compound selected from the group consisting of R'—CN and NC—R"—CN wherein R' is selected from the group consisting of hydrogen, alkyl, phenyl lower alkyl and lower alkenyl and R" is lower alkylene in the presence of a mineral acid catalyst.

References Cited in the file of this patent
UNITED STATES PATENTS

| | | |
|---|---|---|
| 2,320,089 | Lichty | May 25, 1943 |
| 2,457,660 | Gresham et al. | Dec. 28, 1948 |
| 2,719,176 | Coover et al. | Sept. 27, 1955 |

OTHER REFERENCES

Nightingale et al.: J. Org. Chem., vol. 7 (1942), pp. 6–14.

Plant et al.: J. Am. Chem. Soc., vol. 73, pp. 4076–4077 (1951).

Bromme, Ber., vol. 21 (1888), p. 2706.

Landau, Ber., vol. 25 (1892), pp. 3011–18.

Lustig, Ber., vol. 28 (1895), pp. 2986–2994.

Jacobs et al.: Jr. Biol. Chem., vol. 20 (1915), pp. 685–688.